US012799272B2

(12) United States Patent
Tamashiro et al.

(10) Patent No.: US 12,799,272 B2
(45) Date of Patent: Nov. 17, 2026

(54) THERMOPLASTIC POLYESTER ELASTOMER, RESIN COMPOSITION CONTAINING SUCH ELASTOMER, AND MOLDED ARTICLE OBTAINED FROM THE RESIN COMPOSITION

(71) Applicant: TOYOBO MC Corporation, Osaka (JP)

(72) Inventors: Yuki Tamashiro, Shiga (JP); Takuya Akaishi, Shiga (JP); Yoshitaka Ayuzawa, Shiga (JP)

(73) Assignee: TOYOBO MC CORPORATION, Osaka (JP)

( * ) Notice: Subject to any disclaimer, the term of this patent is extended or adjusted under 35 U.S.C. 154(b) by 550 days.

(21) Appl. No.: 18/282,864

(22) PCT Filed: Mar. 7, 2022

(86) PCT No.: PCT/JP2022/009688
§ 371 (c)(1),
(2) Date: Sep. 19, 2023

(87) PCT Pub. No.: WO2022/209605
PCT Pub. Date: Oct. 6, 2022

(65) Prior Publication Data

US 2024/0158571 A1 May 16, 2024

(30) Foreign Application Priority Data

Mar. 30, 2021 (JP) ................................ 2021-058121

(51) Int. Cl.

| | |
|---|---|
| ***C08G 63/183*** | (2006.01) |
| ***C08G 63/672*** | (2006.01) |
| ***C08G 63/91*** | (2006.01) |
| ***C08G 64/02*** | (2006.01) |
| ***C08K 5/13*** | (2006.01) |
| ***C08K 5/18*** | (2006.01) |
| ***C08L 69/00*** | (2006.01) |
| ***F16L 11/04*** | (2006.01) |

(52) U.S. Cl.
CPC ......... *C08G 63/183* (2013.01); *C08G 63/672* (2013.01); *C08G 63/916* (2013.01); *C08G 64/0208* (2013.01); *C08K 5/13* (2013.01); *C08K 5/18* (2013.01); *C08L 69/005* (2013.01); *F16L 11/04* (2013.01); *C08L 2201/02* (2013.01); *C08L 2201/08* (2013.01); *C08L 2203/30* (2013.01); *C08L 2207/04* (2013.01)

(58) Field of Classification Search
CPC .. C08G 63/183; C08G 63/672; C08G 63/916; C08G 64/0208; C08K 5/13; C08K 5/18; C08L 69/00; C08L 2201/02; C08L 2201/08; C08L 2203/30; C08L 2207/04; C08L 69/005; F16L 11/04
USPC ...................................................... 528/308.6
See application file for complete search history.

(56) References Cited

FOREIGN PATENT DOCUMENTS

| | | | |
|---|---|---|---|
| JP | 10-17657 | 1/1998 | |
| JP | 2003-192778 | 7/2003 | |
| JP | 2008-115197 | 5/2008 | |
| JP | 4244067 | 3/2009 | |
| JP | 2011-094000 | 5/2011 | |
| WO | WO-2018155411 A1 * | 8/2018 | .............. C08K 5/34 |
| WO | 2018/174129 | 9/2018 | |
| WO | 2021/172348 | 9/2021 | |

OTHER PUBLICATIONS

Maeda et al., WO 2018/174129 A1 machine translation in English, Sep. 27, 2018. (Year: 2018).*
Tamashiro, WO 2018/155411 A1 machine translation in English, Aug. 30, 2018. (Year: 2018).*
International Preliminary Report on Patentability and Written Opinion issued Oct. 3, 2023 in corresponding International (PCT) Patent Application No. PCT/JP2022/009688.
International Search Report dated Apr. 19, 2022 in International (PCT) Application No. PCT/JP2022/009688.

* cited by examiner

*Primary Examiner* — David T Karst
(74) *Attorney, Agent, or Firm* — Wenderoth, Lind & Ponack, L.L.P.

(57) ABSTRACT

A thermoplastic polyester elastomer includes a hard segment made of a polyester constituted of an aromatic dicarboxylic acid and an aliphatic or alicyclic diol and a soft segment made of an aliphatic polycarbonate, and the hard and soft segments are bonded to each other. The thermoplastic polyester elastomer is at least partially end-capped with a reactive compound including a polycarbodiimide, has an acid value of 15 eq/ton or less, and under a condition of 230° C., satisfies (i) the melt viscosity at a shear rate of 10/sec after a 5-minute preheat is 1,800 Pa·s or more, and the melt viscosity at a shear rate of 1,000/sec after a 5-minute preheat is 800 Pa·s or less; and (ii) a ratio of the melt viscosity measured at a shear rate of 10/sec after a 5-minute preheat to the melt viscosity measured at a shear rate of 10/sec after a 25-minute preheat is 0.7-1.3.

5 Claims, No Drawings

THERMOPLASTIC POLYESTER ELASTOMER, RESIN COMPOSITION CONTAINING SUCH ELASTOMER, AND MOLDED ARTICLE OBTAINED FROM THE RESIN COMPOSITION

TECHNICAL FIELD OF THE INVENTION

The present invention relates to a thermoplastic polyester elastomer having excellent formability, particularly extrusion moldability and extrusion molding stability, as well as heat resistance, weather resistance, heat aging resistance, water resistance, low-temperature characteristics, and the like. The present invention also relates to a resin composition containing such an elastomer, and a molded article obtained from the resin composition.

BACKGROUND ART

In recent years, materials of parts of automobiles and home electric appliances such as cables and hoses have been replaced by thermoplastic resins from conventional materials such as metals and rubbers. In addition, with the advancement of the performance of automobiles and home electric appliances, the number of cases where a plurality of components are arranged close to each other is increasing, and there is an increasing chance that resin components are exposed to ultra-high temperatures higher than in conventional cases. Therefore, development of a resin having all of heat aging resistance, flame retardancy, and hydrolysis resistance is strongly desired.

A vinyl chloride-based resin, an olefinic resin, a polyester-based resin, or the like has been used as a constituent resin of a cable. However, vinyl chloride-based resins and olefinic resins have low melting points and poor heat resistance. In addition, a polyester-based resin has a relatively high melting point but poor hydrolysis resistance and has a problem when used outdoors or in vehicles. In order to solve these problems, it has been proposed to use a thermoplastic polyester elastomer as a constituent resin of a cable.

Regarding such thermoplastic polyester elastomer, a thermoplastic polyester elastomer prepared from a crystalline polyester such as polybutylene terephthalate (PBT) and polybutylene naphthalate (PBN) as a hard segment and a polyoxyalkylene glycol such as polyoxytetramethylene glycol (PTMG) and/or a polyester such as polycaprolactone (PCL) and polybutylene adipate (PBA) as a soft segment has been known and put into practical use (for example, see Patent Documents land 2).

A polyester polyether type elastomer using a polyoxyalkylene glycol as a soft segment as disclosed in Patent Document 1 is excellent in water resistance and low-temperature characteristics but is poor in heat aging resistance. A polyester polyester type elastomer using a polyester as a soft segment as disclosed in Patent Document 2 is excellent in heat aging resistance but is poor in water resistance and low-temperature characteristics. Therefore, neither of them has been able to satisfy the recent market demands.

To solve these problems, a thermoplastic polyester elastomer in which heat resistance and water resistance are improved by using an aliphatic carbonate as a soft segment has been proposed (see Patent Document 3).

However, the viscosity of a thermoplastic polyester elastomer of Patent Document 3 is likely to increase at the time of extrusion molding, and thus it is extremely difficult to control the melt viscosity. Therefore, it has been difficult to stably produce a hollow and long molded article such as a cable and a hose with a uniform thickness for a long time by extrusion molding.

PRIOR ART DOCUMENTS

Patent Documents

Patent Document 1: Japanese Patent Application Laid-Open (JP-A) No. 17657/98
Patent Document 2: Japanese Patent Application Laid-Open (JP-A) No. 2003-192778
Patent Document 3: Japanese Patent No. 4244067

DISCLOSURE OF THE INVENTION

Problem that the Invention is to Solve

The present invention has been made in order to overcome the problems of the conventional thermoplastic polyester elastomers described above. An object of the present invention is to provide a thermoplastic polyester elastomer having excellent extrusion moldability and extrusion molding stability as well as heat resistance, weather resistance, heat aging resistance, water resistance, low-temperature characteristics, and the like, from which a hollow and long molded article such as a cable and a hose can be stably produced with a uniform thickness for a long time.

Means for Solving the Problem

In order to achieve the above object, the present inventors have intensively studied particularly a method for preventing the problem of viscosity increase at the time of extrusion molding of a conventional thermoplastic polyester elastomer in which an aliphatic carbonate is used as a soft segment. As a result, the present inventors have found that the extrusion moldability can be improved by suitably controlling the acid value of the thermoplastic polyester elastomer and the melt viscosity at a low shear rate and the melt viscosity at a high shear rate within respective specific ranges, and that the extrusion molding stability can be improved by suitably controlling the change over time (residence stability) of the melt viscosity at a low shear rate within a specific range so as to suppress the viscosity increase during extrusion molding over a long period of time. In addition, the present inventors have found that it is important, in order to control the melt viscosity and the residence stability thereof within specific ranges, to end-cap the thermoplastic polyester elastomer with a reactive compound having a reactive functional group so as to increase the molecular weight of and/or impart branching to the thermoplastic polyester elastomer, or to reduce the acid value of the thermoplastic polyester elastomer to a specific range.

The present invention has been achieved on the basis of the above findings and has the constituent features of the following (1) to (5).

(1) A thermoplastic polyester elastomer comprising a hard segment made of a polyester constituted of an aromatic dicarboxylic acid and an aliphatic or alicyclic diol and a soft segment mainly made of an aliphatic polycarbonate, wherein the hard segment and the soft segment are bonded to each other, wherein the thermoplastic polyester elastomer is at least partially end-capped with a reactive compound, wherein the reactive compound comprises a polycarbodiimide, wherein the thermoplastic polyester elastomer has an acid value of 15 eq/ton or less, and wherein, when a melt viscosity of the thermoplastic polyester elastomer is measured under a condition of 230° C. in accordance with JIS K 7199, the thermoplastic polyester elastomer satisfies (i) and (ii) below:

(i) the melt viscosity at a shear rate of 10/sec after a preheating time of 5 minutes is 1,800 Pa·s or more, and the melt viscosity at a shear rate of 1,000/sec after a preheating time of 5 minutes is 800 Pa·s or less; and (ii) a ratio of the melt viscosity measured at a shear rate of 10/sec after a preheating time of 5 minutes to the melt viscosity measured at a shear rate of 10/sec after a preheating time of 25 minutes is 0.7 to 1.3.

(2) The thermoplastic polyester elastomer according to (1), wherein a reactive compound having at least one functional group selected from the group consisting of a glycidyl group, an acid anhydride group, and an isocyanate group is further comprised as the reactive compound.

(3) A resin composition containing the thermoplastic polyester elastomer according to (1) or (2) and a flame retardant.

(4) A molded article obtained by extrusion molding of the thermoplastic polyester elastomer according to (1) or (2) or of the resin composition according to (3).

(5) The molded article according to (4), wherein the molded article is a cable or a hose.

Effects of the Invention

The thermoplastic polyester elastomer of the present invention satisfies basic performance requirements for parts of automobiles and home electric appliances, such as heat resistance, weather resistance, heat aging resistance, water resistance, and low-temperature characteristics, and is also excellent in extrusion moldability and extrusion molding stability, so that it is possible to stably produce for a long time a hollow and long molded article required to have a uniform thickness such as a cable and a hose.

MODE FOR CARRYING OUT THE INVENTION

The thermoplastic polyester elastomer of the present invention is based on a thermoplastic polyester elastomer comprising a hard segment made of a polyester constituted of an aromatic dicarboxylic acid and an aliphatic or alicyclic diol and a soft segment mainly made of an aliphatic polycarbonate, wherein the hard segment and the soft segment are bonded to each other. The thermoplastic polyester elastomer of the present invention is characterized in that the thermoplastic polyester elastomer is at least partially end-capped with a reactive compound comprising a polycarbodiimide, has an acid value in a specific range, further has a melt viscosity at a low shear rate and a melt viscosity at a high shear rate in specific ranges, and shows a change over time (residence stability) of the melt viscosity at a low shear rate in a specific range.

First, the hard segment of the thermoplastic polyester elastomer will be described. This hard segment is made of a polyester constituted of an aromatic dicarboxylic acid and an aliphatic or alicyclic diol.

Among the constituent components of the polyester of the hard segment of the thermoplastic polyester elastomer, an ordinary aromatic dicarboxylic acid is widely used as the aromatic dicarboxylic acid, and the aromatic dicarboxylic acid is not particularly limited but is desirably mainly terephthalic acid or naphthalenedicarboxylic acid. Examples of other acid components include: aromatic dicarboxylic acids such as biphenyldicarboxylic acid, isophthalic acid, and sodium 5-sulfoisophthalate; alicyclic dicarboxylic acids such as cyclohexanedicarboxylic acid and tetrahydrophthalic anhydride; and aliphatic dicarboxylic acids such as succinic acid, glutaric acid, adipic acid, azelaic acid, sebacic acid, dodecanedioic acid, dimer acids, and hydrogenated dimer acids. These are used in a range in which the melting point of the resin is not significantly lowered, and the amount thereof is preferably less than 30 mol %, and more preferably less than 20 mol %, of the total acid components.

Among the constituent components of the polyester of the hard segment of the thermoplastic polyester elastomer, an ordinary aliphatic or alicyclic diol is widely used as the aliphatic or alicyclic diol, and the aliphatic or alicyclic diol is not particularly limited but is desirably mainly an alkylene glycol having two to eight carbon atoms. Specific examples thereof include ethylene glycol, 1,3-propylene glycol, 1,4-butanediol, 1,6-hexanediol, and 1,4-cyclohexanedimethanol. Among them, 1,4-butanediol and 1,4-cyclohexanedimethanol are most preferable.

Specifically, the component constituting the polyester of the hard segment of the thermoplastic polyester elastomer is preferably composed of a butylene terephthalate unit or a butylene naphthalate unit from the viewpoint of physical properties, moldability, and cost performance.

The polyester constituting the hard segment of the thermoplastic polyester elastomer can be easily obtained according to an ordinary method for producing polyester. Such a polyester desirably has a number average molecular weight of 10,000 to 40,000.

Next, the soft segment of the thermoplastic polyester elastomer will be described. This soft segment is mainly made of an aliphatic polycarbonate. Here, the term "mainly" means that the aliphatic polycarbonate accounts for 60 mass % or more, preferably 80 mass % or more, and more preferably 90 mass % or more, of the soft segment.

The aliphatic polycarbonate constituting the soft segment of the thermoplastic polyester elastomer is preferably mainly made of an aliphatic diol residue having 2 to 12 carbon atoms. Examples of such an aliphatic diol include ethylene glycol, 1,3-propylene glycol, 1,4-butanediol, 1,5-pentanediol, 1,6-hexanediol, 1,8-octanediol, 2,2-dimethyl-1,3-propanediol, 3-methyl-1,5-pentanediol, 2,4-diethyl-1,5-pentanediol, 1,9-nonanediol, and 2-methyl-1,8-octanediol. In particular, an aliphatic diol having 5 to 12 carbon atoms is preferable from the viewpoint of flexibility and low-temperature characteristics of the polyester elastomer resin composition to be obtained. These components may be used singly, or two or more kinds thereof may be used in combination as necessary.

As to the aliphatic polycarbonate diol having good low-temperature characteristics and constituting the soft segment of the thermoplastic polyester elastomer, an aliphatic polycarbonate diol having a low melting point (such as 70° C. or lower) and a low glass transition temperature is preferable. In general, an aliphatic polycarbonate diol made of 1,6-hexanediol used for forming a soft segment of a thermoplastic polyester elastomer has a low glass transition temperature of about −60° C. and a melting point of about 50° C. and therefore has good low-temperature characteristics. In addition, an aliphatic polycarbonate diol obtained by copolymerizing an appropriate amount of, for example, 3-methyl-1,5-pentanediol with the above aliphatic polycarbonate diol has a glass transition point slightly higher than that of the original aliphatic polycarbonate diol, but has a lower melting point or becomes amorphous, and thus corresponds to an aliphatic polycarbonate diol having good low-temperature characteristics. In addition, for example, since an aliphatic polycarbonate diol made of 1,9-nonanediol and 2-methyl-1,8-octanediol has a melting point of about 30° C. and a glass transition temperature of about −70° C., which are sufficiently low, the aliphatic polycarbonate diol corresponds to an aliphatic polycarbonate diol having good low-temperature characteristics.

The aliphatic polycarbonate diol is not necessarily composed of only a polycarbonate component but may be obtained by copolymerization with a small amount of other glycol, dicarboxylic acid, ester compound, ether compound, or the like. Examples of the copolymerization component include glycols such as dimer diols, hydrogenated dimer diols, and modified products thereof, dicarboxylic acids such as dimer acids and hydrogenated dimer acids, polyesters or oligoesters made of aliphatic, aromatic, or alicyclic dicarboxylic acids and glycols, polyesters or oligoesters composed of ε-caprolactone and the like, and polyalkylene glycols such as polytetramethylene glycol and polyoxyethylene glycol or oligoalkylene glycols.

The copolymerization component can be used in such an amount that the effect of the aliphatic polycarbonate segment is not substantially lost. Specifically, the amount is 40 parts by mass or less, preferably 30 parts by mass or less, and more preferably 20 parts by mass or less, with respect to 100 parts by mass of the aliphatic polycarbonate segment. When the amount of the copolymerization component is too large, the resulting polyester elastomer resin composition may be poor in heat aging resistance and water resistance.

In the thermoplastic polyester elastomer, the mass ratio of the polyester constituting the hard segment, the aliphatic polycarbonate constituting the soft segment, and the copolymer component as desired is generally such that hard segment:soft segment=30:70 to 95:5, preferably 40:60 to 90:10, more preferably 45:55 to 87:13, and most preferably 50:50 to 85:15.

As explained above, the thermoplastic polyester elastomer is a thermoplastic polyester elastomer comprising a hard segment made of a polyester constituted of an aromatic dicarboxylic acid and an aliphatic or alicyclic diol and a soft segment mainly made of an aliphatic polycarbonate, wherein the hard segment and the soft segment are bonded to each other. Here, the term "bonded" preferably indicates not a state in which the hard segment and the soft segment are bonded with a chain extender such as an isocyanate compound, but a state in which units constituting the hard segment and the soft segment are directly bonded by ester bonds or carbonate bonds. In order to produce such a state, for example, it is preferable to obtain the thermoplastic polyester elastomer through a blocking reaction in which transesterification reactions and depolymerization reactions of the polyester constituting the hard segment, the polycarbonate constituting the soft segment, and various copolymerization components as desired are repeated for a certain period of time in a molten state.

The blocking reaction is preferably performed at a temperature within a range from the melting point of the polyester constituting the hard segment to a temperature higher than the melting point by 30° C. In this reaction, the active catalyst concentration in the system is arbitrarily set according to the temperature at which the reaction is performed. That is, since the transesterification reaction and the depolymerization rapidly proceed at a higher reaction temperature, it is desirable that the active catalyst concentration in the system is low. In the meantime, it is desirable that a certain concentration of the active catalyst is present at a lower reaction temperature.

As to the catalyst, those that are usually employed, such as one kind or two or more kinds of titanium compounds such as titanium tetrabutoxide and potassium oxalate titanate and tin compounds such as dibutyltin oxide and monohydroxybutyltin oxide can be used. The catalyst may be already present in the polyester or polycarbonate, in which case no fresh addition is required. Furthermore, the catalyst in the polyester or polycarbonate may have been partially or substantially completely deactivated in advance by any method. For example, when titanium tetrabutoxide is used as the catalyst, deactivation is performed by adding a phosphorus compound or the like such as phosphorous acid, phosphoric acid, triphenyl phosphate, tristriethylene glycol phosphate, orthophosphoric acid, carbethoxydimethyldiethyl phosphonate, triphenyl phosphite, trimethyl phosphate, and trimethyl phosphite, but this method is not limiting.

The above reaction can be performed by arbitrarily determining the combination of the reaction temperature, the catalyst concentration, and the reaction time. That is, since the reaction conditions may vary depending on various factors such as the types and amount ratios of the hard segment and the soft segment to be used, the shape of the device to be used, and the stirring situation, the optimum values thereof may be appropriately adopted.

The optimum values of the above reaction conditions exist, for example, when the melting point of the obtained chain-extended polymer is compared with the melting point of the polyester used as the hard segment, and the difference is 2° C. to 60° C. If the difference in melting point is less than 2° C., both segments are not mixed or/and reacted, and the resulting polymer may exhibit poor elastic performance. On the other hand, when the difference in melting point exceeds 60° C., the progress of the transesterification reaction is remarkable, so that the block property of the obtained polymer may be impaired, and the crystallinity, the elastic performance, and the like may be impaired.

It is desirable that the remaining catalyst in the molten mixture obtained by the above reaction is deactivated as completely as possible by a conventionally known method. When the catalyst remains more than necessary, the transesterification reaction further proceeds during compounding, molding, or the like, and the physical properties of the obtained polymer may fluctuate.

For example, the deactivation reaction is carried out by the method described above, that is, addition of a phosphorus compound or the like such as phosphorous acid, phosphoric acid, triphenyl phosphate, tristriethylene glycol phosphate, orthophosphoric acid, carbethoxydimethyldiethyl phosphonate, triphenyl phosphite, trimethyl phosphate, and trimethyl phosphite, but this method is not limiting.

The thermoplastic polyester elastomer may contain only a small amount of a tri- or higher functional polycarboxylic acid or a tri- or higher hydric polyol. For example, trimellitic anhydride, benzophenonetetracarboxylic acid, trimethylolpropane, glycerol, or the like can be used.

In the present invention, the thermoplastic polyester elastomer is at least partially end-capped with a reactive compound. Hereinafter, the thermoplastic polyester elastomer in this state is referred to as an "end-capped thermoplastic polyester elastomer". By at least partially end-capping the thermoplastic polyester elastomer with the reactive functional group in the reactive compound, it is possible to increase the molecular weight of and/or impart branching to the thermoplastic polyester elastomer and to effectively reduce the acid value of the thermoplastic polyester elastomer, and thus it is possible to improve the melt viscosity characteristics and the residence stability of the thermoplastic polyester elastomer.

In the present invention, the phrase "the thermoplastic polyester elastomer is at least partially end-capped with a reactive compound" means that not "all" of the end groups of the thermoplastic polyester elastomer are required to be capped with a reactive compound. The present invention is based on the assumption that "most" of the end groups of the thermoplastic polyester elastomer are capped with a reactive compound, and a state of a composition in which a free reactive compound is mixed is also included. This is because it is difficult to cap "all" of the end groups of the thermoplastic polyester elastomer with a reactive compound even if the reactive compound is excessively added or the method for adding the reactive compound is devised as described later. Although it is difficult to directly measure the end-capping ratio of the thermoplastic polyester elastomer, it can be estimated using the acid value of the thermoplastic polyester elastomer as an index. As the thermoplastic polyester elastomer becomes end-capped, the acid value of the thermoplastic polyester elastomer is reduced to a value lower than the acid value of the original thermoplastic polyester elastomer.

In the present invention, the reactive compound has a role of controlling the melt viscosity characteristics at a low shear rate and a high shear rate within suitable ranges by imparting branching to the thermoplastic polyester elastomer and/or increasing the molecular weight of the thermoplastic polyester elastomer by end-capping the thermoplastic polyester elastomer, and a role of reducing the acid value of the thermoplastic polyester elastomer and thus improving the residence stability of the melt viscosity by end-capping the thermoplastic polyester elastomer. In the present invention, the reactive compound is not particularly limited as long as it has a reactive functional group capable of reacting with the end groups (hydroxy groups or carboxy groups) of the thermoplastic polyester elastomer, but it is necessary to comprise at least a polycarbodiimide. Of the two roles described above, the polycarbodiimide is particularly excellent in the latter role of reducing the acid value of the thermoplastic polyester elastomer, and thus the polycarbodiimide can greatly contribute to the improvement of the residence stability of the melt viscosity. It is sufficient that the polycarbodiimide that can be used in the present invention is a polycarbodiimide having two or more carbodiimide groups (—N═C═N— structure) in one molecule, and examples thereof include aliphatic polycarbodiimides, alicyclic polycarbodiimides, aromatic polycarbodiimides, and copolymers thereof. An aliphatic polycarbodiimide or an alicyclic polycarbodiimide is preferable.

The polycarbodiimide can be obtained, for example, by a carbon dioxide removal reaction of a diisocyanate compound. Examples of the diisocyanate compound that can be used here include 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, 1,5-naphthylene diisocyanate, hexamethylene diisocyanate, dicyclohexylmethane diisocyanate, cyclohexane-1,4-diisocyanate, xylylene diisocyanate, isophorone diisocyanate, methylcyclohexane diisocyanate, tetramethylxylylene diisocyanate, and 1,3,5-triisopropylphenylene-2,4-diisocyanate. These may be used singly or in combination of two or more. In addition, a branched structure may be introduced, or a functional group other than a carbodiimide group and an isocyanate group may be introduced by copolymerization. Furthermore, the terminal isocyanate can be used as it is, but the degree of polymerization may be controlled by reacting the terminal isocyanate, or a part of the terminal isocyanate may be capped.

The polycarbodiimide preferably includes an isocyanate group at a terminal, and the isocyanate group content is preferably 0.5 to 4 mass % from the viewpoint of stability and handleability. More preferably, the isocyanate group content is 1 to 3 mass %. In particular, a polycarbodiimide derived from dicyclohexylmethane diisocyanate or isophorone diisocyanate and having an isocyanate group content in the above range is preferable. The isocyanate group content can be measured using a conventional method (a method of dissolving the polycarbodiimide with an amine and performing back titration with hydrochloric acid).

The polycarbodiimide preferably contains 2 to 50 carbodiimide groups per molecule from the viewpoint of stability and handleability. More preferably, the polycarbodiimide contains 5 to 30 carbodiimide groups per molecule. The number of carbodiimide groups in the polycarbodiimide molecule (that is, the carbodiimide group number) corresponds to the degree of polymerization in the case of a polycarbodiimide obtained from a diisocyanate compound. For example, the polymerization degree of a polycarbodiimide obtained by chain-linking 21 units of a diisocyanate compound is 20, and the carbodiimide group number in the molecular chain is 20. Since a polycarbodiimide is usually a mixture of molecules of various lengths, the carbodiimide group number is represented by an average value. When the polycarbodiimide has a carbodiimide group number within the above range and is solid at around room temperature, the polycarbodiimide can be pulverized, and thus the polycarbodiimide is excellent in workability and compatibility at the time of mixing with the thermoplastic polyester elastomer described later and is also preferable in terms of uniform reactivity and bleed out resistance. For example, the carbodiimide group number can be measured using a conventional method (a method of dissolving the polycarbodiimide with an amine and performing back titration with hydrochloric acid).

The polycarbodiimide alone is sufficient as the reactive compound used in the present invention, but a reactive compound having at least one functional group selected from the group consisting of a glycidyl group (epoxy group), an acid anhydride group, and an isocyanate group may be further contained as necessary. The number of functional groups in the reactive compound is two or more per molecule. As described above, the polycarbodiimide is excellent in the role of lowering the acid value of the thermoplastic polyester elastomer but is inferior in the role of imparting branching to the thermoplastic polyester elastomer due to its stereostructural factor. Therefore, the weak point of the polycarbodiimide can be supplemented by further including a reactive compound having at least one functional group selected from the group consisting of a glycidyl group (epoxy group), an acid anhydride group, and an isocyanate group.

When the reactive compound is a compound having the epoxy group (glycidyl group), specific examples of a polyfunctional epoxy compound having two or more epoxy groups include 1,6-dihydroxynaphthalene diglycidyl ether and 1,3-bis(oxiranylmethoxy)benzene each having two epoxy groups, 1,3,5-tris(2,3-epoxypropyl)-1,3,5-triazine-2,4,6 (1H, 3H, 5H)-trione and diglycerol triglycidyl ether each having three epoxy groups, and a polycondensate of 1-chloro-2,3-epoxypropane/formaldehyde/2,7-naphthalenediol and pentaerythritol polyglycidyl ether each having four epoxy groups. Among them, a polyfunctional epoxy compound having heat resistance of the skeleton is preferable. In particular, a bifunctional or tetrafunctional epoxy compound having a naphthalene structure in the skeleton or a trifunctional epoxy compound having a triazine structure in the skeleton is preferable. In consideration of the degree of increase in the solution viscosity of the thermoplastic polyester elastomer, the effect of efficiently decreasing the acid value of the thermoplastic polyester elastomer, and the degree of gelation due to aggregation and solidification of the epoxy itself, a bifunctional or trifunctional epoxy compound is preferable.

Other examples include a copolymer containing 2 or more glycidyl groups per molecule, having a weight average molecular weight of 4,000 to 25,000, and made of (X) 20 to 99 mass % of a vinyl aromatic monomer, (Y) 1 to 80 mass % of glycidyl (meth)acrylate, and (Z) 0 to 79 mass % of a vinyl group-containing monomer other than (X) not containing an epoxy group.

When the reactive compound is a compound having the acid anhydride group, a compound containing two to four anhydride units per molecule is preferable from the viewpoint of stability and handleability. Examples of such a compound include phthalic anhydride, trimellitic anhydride, and pyromellitic anhydride.

When the reactive compound is a compound having the isocyanate group, an isocyanate compound to be a raw material of the polycarbodiimide described above can be mentioned.

Next, an end-capping method using the reactive compound will be described. In order to end-cap the thermoplastic polyester elastomer with the reactive compound, it is sufficient that the thermoplastic polyester elastomer and the reactive compound are mixed and brought into contact with each other. The contacting causes the reactive functional groups in the reactive compound to react with the end groups of the thermoplastic polyester elastomer to end-cap the thermoplastic polyester elastomer. The reaction between the end groups of the thermoplastic polyester elastomer and the reactive functional group in the reactive compound can occur without a catalyst, but it is desirable to use a catalyst from the viewpoint of accelerating the reaction. As to the catalyst, generally, amines, imidazoles, and the like are preferable.

When the reactive compound is a polycarbodiimide, the blending amount thereof is preferably 0.5 to 10 parts by mass, and more preferably 0.5 to 5 parts by mass, with respect to 100 parts by mass of the thermoplastic polyester elastomer. When the content is more than the above upper limit, flexibility may be impaired, or mechanical characteristics, heat resistance, and melt viscosity may be reduced. When the content is less than the lower limit, the amount of —N═C═N— in the thermoplastic polyester elastomer is reduced, and the effect of improving hydrolysis resistance and the effect of improving extrusion moldability may be poor. On the other hand, when the reactive compound is a reactive compound having at least one functional group selected from the group consisting of a glycidyl group (epoxy group), an acid anhydride group, and an isocyanate group, the blending amount thereof is preferably 0.1 to 4.5 parts by mass, and more preferably 0.1 to 4 parts by mass, with respect to 100 parts by mass of the thermoplastic polyester elastomer. When the content is more than the above upper limit, the thickening effect becomes excessive, which may adversely affect the moldability or affect the mechanical characteristics of the molded body. When the amount is less than the lower limit, the target effect of imparting branching or extending a molecular chain may be insufficient.

In order to ensure that the blended reactive compound can be in contact with and react with the end groups of the thermoplastic polyester elastomer, it is preferable to devise the order in the method for adding the reactive compound to the thermoplastic polyester elastomer. For example, instead of simultaneously mixing all of the thermoplastic polyester elastomer, the reactive compound, and an additive such as a flame retardant that can be blended as desired as described later as in the conventional case, the reactive compound is previously added and attached to a part of the thermoplastic polyester elastomer, on the other hand, the remaining thermoplastic polyester elastomer and the additive are mixed and melted, and the thermoplastic polyester elastomer to which the reactive compound has been added and attached is added to the melt, whereby the reactive compound can be uniformly melt-kneaded, and the reactive compound can be reliably brought into contact and react with the end groups of the thermoplastic polyester elastomer. If the reactive compound is not melt-kneaded uniformly, the end groups of the thermoplastic polyester elastomer are not sufficiently capped. In addition, the unreacted reactive compound remains in the composition and may adversely affect the extrusion process. Specifically, when part of the thermoplastic polyester elastomer that is not end-capped is present, thermal decomposition or hydrolysis is likely to occur in residence during prolonged extrusion molding, and there is a possibility that the molecular weight is reduced or the melt viscosity is reduced. When the unreacted reactive compound is present, gelation may occur, and the melt viscosity may be likely to increase.

The end-capped thermoplastic polyester elastomer thus obtained has a lower acid value than the original thermoplastic polyester elastomer because the terminal acid groups are capped. Specifically, a low level of acid value of 15 eq/ton or less, preferably 10 eq/ton or less, and more preferably 5 eq/ton or less, can be achieved. The lower limit of the acid value is not particularly limited but is, for example, 0 eq/ton. When the acid value is in the above range, the residence stability of the melt viscosity during molding is improved, and in the case of extrusion molding of a hollow and long object such as a cable and a hose, the thickness uniformity is improved. The acid value also contributes to heat resistance, heat aging resistance, and hydrolysis resistance, and when the acid value is in the above range, heat resistance, heat aging resistance, and hydrolysis resistance are excellent.

In terms of specific melt viscosity characteristics, the end-capped thermoplastic polyester elastomer of the present invention satisfies (i) and (ii) below, when a melt viscosity thereof is measured under a condition of 230° C. in accordance with JIS K 7199:

(i) the melt viscosity at a shear rate of 10/sec after a preheating time of 5 minutes is 1,800 Pa·s or more, and preferably 2,500 Pa s or more, and the melt viscosity at a shear rate of 1,000/sec after a preheating time of 5 minutes is 800 Pa·s or less, and preferably 700 Pa·s or less; and (ii) a ratio of the melt viscosity measured at a shear rate of 10/sec after a preheating time of 5 minutes to the melt viscosity measured at a shear rate of 10/sec after a preheating time of 25 minutes is 0.7 to 1.3, and preferably 0.8 to 1.2.

The upper limit of the melt viscosity at a shear rate of 10/sec after a preheating time of 5 minutes is not particularly limited but is, for example, 50,000 Pa·s and the lower limit of the melt viscosity at a shear rate of 1,000/sec after a preheating time of 5 minutes is not particularly limited but is, for example, 150 Pa·s.

When the melt viscosity is in the range defined by (i), excellent extrusion moldability is provided. Specifically, when the end-capped thermoplastic polyester elastomer or the resin composition containing the end-capped thermoplastic polyester elastomer is subjected to extrusion molding, the end-capped thermoplastic polyester elastomer or the resin composition has sufficient shape retainability and sufficient flowability for obtaining an extruded product having a thin-film shape or a fine shape, so that it is possible to perform advanced shape design like a molded article that is required to be hollow and long and have a uniform thickness.

The means for satisfying (i) above is not particularly limited, and examples thereof include, as described above, imparting branching to the thermoplastic polyester elastomer or increasing the molecular weight of the thermoplastic polyester elastomer by end-capping the thermoplastic polyester elastomer with the reactive compound. In addition, it is also possible to impart branching to the thermoplastic polyester elastomer by copolymerizing trimethylolpropane during polymerization of the thermoplastic polyester elastomer. Further, in addition to the thermoplastic polyester elastomer, a branched and/or high molecular weight thermoplastic polyester elastomer may be separately blended. By imparting branching or increasing the molecular weight as described above, in a low shear rate region, entanglement of polymer chains increases, the melt viscosity increases, and deformation hardly occurs (shape stability increases), and on the other hand, in a high shear rate region, entanglement of molecular chains is reduced to cause the molecular chains to easily flow, and the above-described thickening effect decreases. This phenomenon is considered to improve thickness uniformity during extrusion molding.

On the other hand, when the melt viscosity is in the range of (ii), sufficient residence stability is obtained, and stable production for a long time is enabled. The means for satisfying (ii) is not particularly limited, and examples thereof include, as described above, reducing the acid value by end-capping the thermoplastic polyester elastomer with the reactive compound. At this time, it is important to perform control so as to leave the least possible terminal acid groups of the thermoplastic polyester elastomer. It is also important to leave the least possible unreacted reactive compound. When part of the thermoplastic polyester elastomer that is not end-capped is present, thermal decomposition or hydrolysis is likely to occur due to residence during prolonged extrusion molding, and there is a possibility that the molecular weight is reduced or the melt viscosity is reduced. When the unreacted reactive compound is present, gelation may occur, and the melt viscosity may be likely to increase.

In the present invention, the end-capped thermoplastic polyester elastomer can be used singly as a molding material, but it is advantageous to use the end-capped thermoplastic polyester elastomer in the form of a resin composition in combination with a flame retardant in order to improve the flame retardancy of the resulting molded article. As to the flame retardant, halogen-based or non-halogen-based flame retardants and flame retardant coagents can be used, and these may be used singly or in combination. Examples of the flame retardant include triazine-based compounds and/or derivatives thereof, phosphorus-based compounds, bromine-based compounds, and antimony compounds. The flame retardant can be contained in an amount of 1 to 40 mass % in the resin composition.

Examples of the triazine-based compound and/or a derivative thereof include melamine, melamine cyanurate, melamine phosphate, and guanidine sulfamate. Examples of the phosphorus-based compound include red phosphorus-based compounds and ammonium polyphosphate salts. Examples of the bromine-based compound include brominated phenoxy resins, brominated epoxy resins, brominated epoxy oligomers, TBA carbonate oligomers, ethylenebis (tetrabromophthal)imide, hexabromobenzene, and decabromodiphenyl ether. Examples of the flame retardant coagent include antimony trioxide, antimony tetraoxide, antimony pentoxide, sodium pyroantimonate, tin dioxide, zinc metaborate, aluminum hydroxide, magnesium hydroxide, zirconium oxide, molybdenum oxide, red phosphorus-based compounds, ammonium polyphosphate salts, melamine cyanurate, and ethylene tetrafluoride.

Furthermore, various additives can be blended in the resin composition of the present invention according to the purpose. Examples of the additive include known hindered phenol-based, sulfur-based, phosphorus-based, and amine-based antioxidants, hindered amine-based, triazole-based, benzophenone-based, benzoate-based, nickel-based, and salicyl-based light stabilizers, antistatic agents, lubricants, molecular modifiers such as peroxides, compounds having a reactive group such as epoxy-based compounds and carbodiimide-based compounds, metal inactivators, organic and inorganic nucleating agents, neutralizing agents, antacid agents, antibacterial agents, optical brighteners, fillers, and organic and inorganic pigments. When these additives are blended, it is preferable that these additives are contained in the resin composition in a total amount of 0.1 to 10 mass %, and more preferably 0.5 to 5 mass %.

These additives can be blended using a kneader such as a heating roll, an extruder, or a Banbury mixer. In addition, the additives can be added to and mixed with the oligomer before the transesterification reaction or before the polycondensation reaction when the thermoplastic polyester elastomer is produced.

The resin composition of the present invention can be produced by mixing the above-described components and, if necessary, various stabilizers, pigments, and the like, and melt-kneading the mixture. As to the melt-kneading method, any method known to those skilled in the art may be used, and a single-screw extruder, a twin-screw extruder, a pressure kneader, a Banbury mixer, or the like can be used. Among them, a twin-screw extruder is preferably used.

As described above, in order to ensure that the reactive compound such as a polycarbodiimide can reliably contact and react with the end groups of the thermoplastic polyester elastomer, instead of simultaneously mixing all the components, it is preferable that the reactive compound is previously added and attached to a part of the thermoplastic polyester elastomer, on the other hand, the remaining thermoplastic polyester elastomer and the additives are mixed and melted, and the thermoplastic polyester elastomer to which the reactive compound has been added and attached is added from a side feeder. When such a charging method is employed, the reactive compound does not adhere to the production device, and the charging loss of the reactive compound can be prevented.

Since the end-capped thermoplastic polyester elastomer of the present invention and the resin composition containing the end-capped thermoplastic polyester elastomer are configured as described above, they have excellent extrusion moldability and extrusion molding stability as well as heat resistance, weather resistance, heat aging resistance, water resistance, low-temperature characteristics, and the like and can be used for stably producing a hollow and long molded article such as a cable and a hose with a uniform thickness for a long time by extrusion molding.

EXAMPLES

Hereinafter, the present invention will be specifically described with reference to examples and comparative examples, but the present invention is not limited by the following examples as a matter of course, and modifications can be made within a range that can conform to the gist described above and below, and all of them are included in the technical scope of the present invention. In the present specification, each measurement was performed according to the following method.

(1) Melting Point (Tm) of Thermoplastic Polyester Elastomer

While the temperature of the thermoplastic polyester elastomer that had been dried under reduced pressure at 50° C. for 15 hours was raised from room temperature at 20° C./min using a differential scanning calorimeter DSC-50 (manufactured by Shimadzu Corporation), the endothermic peak temperature due to melting was measured and defined as the melting point (Tm). On an aluminum pan (manufactured by TA Instruments, product number 900793.901), 10 mg of the sample was weighed, sealed with an aluminum lid (manufactured by TA Instruments, product number 900794.901), and measured in an argon atmosphere.

(2) Reduced Viscosity of Thermoplastic Polyester Elastomer

In 25 mL of a mixed solvent (phenol/tetrachloroethane=60/40), 0.05 g of the thermoplastic polyester elastomer was dissolved, and the reduced viscosity was measured at 30° C. using an Ostwald viscometer.

(3) Acid Value

In 100 ml of benzyl alcohol/chloroform (50/50 mass ratio), 0.5 g of the thermoplastic polyester elastomer was dissolved, and the solution was titrated with an ethanol solution of KOH so as to determine the acid value. Phenol red was used as an indicator. The acid value was expressed as an equivalent (eq/ton) in 1 ton of the resin.

(4) Melt Viscosity

The melt viscosity of the thermoplastic polyester elastomer was measured using "Capilograph 1D" manufactured by Toyo Seiki Seisaku-sho, Ltd. Specifically, the melt viscosity was measured at a shear rate of 10/sec and 1,000/sec after a preheating time of 5 minutes under the conditions of a capillary diameter of 1.0 mm, a capillary length of 40 mm, a cylinder diameter of 9.55 mm, and a temperature of 230° C.

(5) Residence Stability of Melt Viscosity

In the same manner as in the measurement of the melt viscosity, the melt viscosity at a shear rate of 10/sec after a preheating time of 5 minutes was measured and defined as η5. The melt viscosity at a shear rate of 10/sec after a preheating time of 25 minutes was measured and defined as η25. The ratio of both (η5/η25) was determined and defined as the residence stability of the melt viscosity. The closer the ratio is to 1, the better the residence stability is.

(6) Extrusion Moldability

The extrusion moldability was evaluated in terms of fluctuations in discharge amount and thickness uniformity.

[Extrusion Moldability (Fluctuations in Discharge Amount)]

The pellets melt-kneaded with a twin-screw extruder were extruded again from a round die with a single-screw extruder, and strands having a diameter of 3 mm were discharged. From this state, the extrusion moldability (fluctuations in discharge amount) was evaluated according to the following criteria.

○: There is no fluctuation in the discharge amount, and the extrudability is stable.

Δ: The discharge amount is stable when the strands are pulled at a constant speed using a take-up machine, but when the strands are suspended by their own weight, fluctuations in the discharge amount are slightly observed.

x: The discharge amount greatly fluctuates, and taking off of the strands is not possible.

[Extrusion Moldability (Thickness Uniformity)]

The pellets melt-kneaded with a twin-screw extruder were extrusion-molded again from a T-die with a single-screw extruder so as to produce a sheet molded article having a thickness of 0.2 mm. Thickness uniformity of the sheet molded article was measured using a micrometer (model No.: ID-C125B, probe: cemented carbide (M 2.5×0.45), spherical bottom surface) manufactured by Mitutoyo Corporation under a pressure of compressed air of 0.1 MPa. The measurement points were 20 points in a grid pattern at intervals of 90 mm in a region of 450 mm×450 mm at the center of the sheet. The thickness uniformity was determined for two types, initial and over time. The initial thickness uniformity was determined according to the following formula from the maximum and minimum values of the thicknesses measured at the 20 points of the sheet at 5 minutes after the start of the extrusion molding. The thickness uniformity over time was determined according to the following formula from the average maximum value and the average minimum value of the thicknesses at the 20 points of each sheet at 5 minutes, 30 minutes, and 60 minutes after the start of the extrusion molding. Evaluation was performed according to the following criteria. The thickness uniformity over time is particularly referred to as "extrusion molding stability".

$$\text{Thickness uniformity}=[(\text{maximum value})-(\text{minimum value})]/\{[(\text{maximum value})+(\text{minimum value})]/2\}\times 100(\%)$$

○: Thickness uniformity is less than 1%

Δ: Thickness uniformity is 1% or more and less than 3% x: Thickness uniformity is 3% or more (7) Flame Retardancy

To a thermoplastic polyester elastomer dried under reduced pressure at 100° C. for 8 hours, 0.5 mass % of pentaerythrityl-tetrakis [3-(3,5-di-t-butyl-4-hydroxyphenyl) propionate], 0.3 mass % of pentaerythritol tetrakis(3-laurylthiopropionate), 0.5 mass % of 2-(3-t-butyl-5-methyl-2-hydroxyphenyl)benzotriazole, 0.5 mass % of bisphenol A, 0.3 mass % of triphenylphosphine, and compounds described in examples and comparative examples were blended, and the mixture was granulated using an extruder so as to obtain a flame-retardant polyester elastomer resin composition.

Using an injection molding machine (model-SAV, manufactured by Sanjo Seiki Co., Ltd.), the thermoplastic polyester elastomer composition was injection-molded at a cylinder temperature (Tm+20° C.) so as to obtain a 1/32-inch test piece conforming to the UL-94 standard.

The flame retardancy of the test piece obtained by the above method was evaluated in accordance with UL-94. The combustion time was shown as the sum of the combustion times after two flame contacts of each of five samples.

(8) Heat Resistance and Heat Aging Resistance

A type 3 dumbbell-shaped test piece was allowed to stand in an environment of 170° C. for an arbitrary time and then taken out, and the tensile elongation at break was measured in accordance with JIS K 6251: 2010. The retention rate of tensile elongation at break was calculated according to the following formula, and the time at which the rate reached 50% (tensile elongation half-life) was used as an index of heat resistance and heat aging resistance. The initial tensile elongation at break is a tensile elongation at break before the heat resistance and heat aging resistance test.

Retention rate of tensile elongation at break (%)=(tensile elongation at break after heat resistance and heat aging resistance test)/(initial tensile elongation at break)×100

○: The tensile elongation half-life is 800 hr or more.

Δ: The tensile elongation half-life is 400 hr or more and less than 800 hr.

x: The tensile elongation half-life is less than 400 hr.

The type 3 dumbbell-shaped test piece was prepared by injection-molding a resin, which had been dried under reduced pressure at 100° C. for 8 hours, into a flat plate of 100 mm×100 mm×2 mm at a cylinder temperature (Tm+20° C.) and a mold temperature of 30° C. using an injection molding machine (model-SAV, manufactured by Sanjo Seiki Co., Ltd.) and then punching out the type 3 dumbbell-shaped test piece from the flat plate.

The blended raw materials used in examples and comparative examples were as follows.

[Thermoplastic Polyester Elastomer]

As to the thermoplastic polyester elastomer, the following four types A-1 to A-4 were synthesized.

Thermoplastic Polyester Elastomer A-1:

After 100 parts by mass of an aliphatic polycarbonate diol (carbonate diol UH-CARB 200 manufactured by Ube Industries, Ltd., number average molecular weight: 2,000, 1,6-hexanediol type) and 8.6 parts by mass of diphenyl carbonate were charged, the materials were allowed to react at a temperature of 205° C. and 130 Pa. After 2 hours, the contents were cooled to obtain an aliphatic polycarbonate diol with an increased molecular weight (number average molecular weight: 10,000). At 230° C. to 245° C. under 130 Pa, 43 parts by mass of the aliphatic polycarbonate diol (PCD) and 57 parts by mass of polybutylene terephthalate (PBT) having a number average molecular weight of 30,000 were stirred for 1 hour. It was confirmed that the resin became transparent, and the contents were taken out and cooled to obtain a thermoplastic polyester elastomer A-1. This thermoplastic polyester elastomer A-1 had a melting point of 207° C., a reduced viscosity of 1.21 dl/g, and an acid value of 44 eq/ton. The composition and physical properties of the obtained thermoplastic polyester elastomer A-1 are shown in Table 1.

Thermoplastic Polyester Elastomer A-2:

A thermoplastic polyester elastomer A-2 was synthesized in the same manner as for the thermoplastic polyester elastomer A-1 except that trimethylolpropane for imparting branching was copolymerized. Specifically, after 100 parts by mass of an aliphatic polycarbonate diol (carbonate diol UH-CARB 200 manufactured by Ube Industries, Ltd., number average molecular weight: 2,000, 1,6-hexanediol type) and 8.6 parts by mass of diphenyl carbonate were charged, the materials were allowed to react at a temperature of 205° C. and 130 Pa. After 2 hours, the contents were cooled to obtain an aliphatic polycarbonate diol with an increased molecular weight (number average molecular weight: 10,000). At 230° C. to 245° C. under 130 Pa, 43 parts by mass of the aliphatic polycarbonate diol (PCD), 57 parts by mass of polybutylene terephthalate (PBT) having a number average molecular weight of 30,000, and 0.0005 part by mass of trimethylolpropane for imparting branching were stirred for 1 hour. It was confirmed that the resin became transparent, and the contents were taken out and cooled to obtain a thermoplastic polyester elastomer A-2. This thermoplastic polyester elastomer A-2 had a melting point of 214° C., a reduced viscosity of 1.38 dl/g, and an acid value of 39 eq/ton. The composition and physical properties of the obtained thermoplastic polyester elastomer A-2 are shown in Table 1.

Thermoplastic Polyester Elastomer A-3:

For a comparative example, a thermoplastic polyester elastomer A-3 in which the soft segment was not an aliphatic polycarbonate but an aliphatic polyether was synthesized. Specifically, a thermoplastic polyester elastomer A-3 constituted of terephthalic acid, 1,4-butanediol, and polyoxytetramethylene glycol (PTMG; number average molecular weight: 1,000) and having the ratio hard segment (polybutylene terephthalate)/soft segment (PTMG)=56/44 (mass %) was obtained in the same method as described above. This thermoplastic polyester elastomer A-3 had a melting point of 203° C., a reduced viscosity of 1.75 dl/g, and an acid value of 50 eq/ton. The composition and physical properties of the obtained thermoplastic polyester elastomer A-3 are shown in Table 1.

Thermoplastic Polyester Elastomer A-4:

A thermoplastic polyester elastomer A-4 was synthesized in the same manner as for the thermoplastic polyester elastomer A-1 except that the molecular weight increase rate of the aliphatic polycarbonate diol was increased. Specifically, after 100 parts by mass of an aliphatic polycarbonate diol (carbonate diol UH-CARB 200 manufactured by Ube Industries, Ltd., number average molecular weight: 2,000, 1,6-hexanediol type) and 9.6 parts by mass of diphenyl carbonate were charged, the materials were allowed to react at a temperature of 205° C. and 130 Pa. After 2 hours, the contents were cooled to obtain an aliphatic polycarbonate diol with an increased molecular weight (number average molecular weight: 20,000). At 230° C. to 245° C. under 130 Pa, 43 parts by mass of the aliphatic polycarbonate diol (PCD) and 57 parts by mass of polybutylene terephthalate (PBT) having a number average molecular weight of 30,000 were stirred for 1 hour. It was confirmed that the resin became transparent, and the contents were taken out and cooled to obtain a thermoplastic polyester elastomer A-4. This thermoplastic polyester elastomer A-4 had a melting point of 207° C., a reduced viscosity of 1.25 dl/g, and an acid value of 49 eq/ton. The composition and physical properties of the obtained thermoplastic polyester elastomer A-4 are shown in Table 1.

TABLE 1

| | | | | Physical properties | | |
|---|---|---|---|---|---|---|
| | Composition (mass %) | | | Melting point | Acid value | Melt viscosity |
| Abbreviation | PBT | PTMG | PCD | (° C.) | (eq/ton) | (dl/g) |
| A-1 | 57 | | 43 | 207 | 44 | 1.21 |
| A-2 | 57 | | 43 | 214 | 39 | 1.38 |
| A-3 | 56 | 44 | | 203 | 50 | 1.75 |
| A-4 | 57 | | 43 | 207 | 49 | 1.25 |

PBT: Polybutylene terephthalate
PTMG: Poly(tetramethylene oxide) glycol
PCD: Aliphatic polycarbonate diol

[Reactive Compound]

B-1: Alicyclic polycarbodiimide (Carbodilite HMV-15CA, manufactured by Nisshinbo Chemical Inc.)

B-2: Triglycidyl isocyanurate compound (TEPIC-S manufactured by Nissan Chemical Corporation, epoxy number (average number of epoxy groups per molecule): 3)

B-3: Styrene/glycidyl acrylate copolymer (ARTAF (MqUG-4050, manufactured by Toagosei Co., Ltd., Mw: 8,500, epoxy value: 670 equivalents/1×$10^6$ g)

B-4: Epoxy group-containing olefinic copolymer (Bond First BF-7M, manufactured by Sumitomo Chemical Co., Ltd., epoxy value: 0.4 meq/g)

[Flame Retardant]

C-1: Brominated polystyrene (PDBS-80, manufactured by Lanxess AG)

C-2: Antimony trioxide (PATOX MK, manufactured by Nihon Seiko Co., Ltd.)

[Other Additives]

D-1: Release agent Licowax E (manufactured by Clariant Japan K.K.), 0.2 part by weight D-2: Hindered phenol-based antioxidant Irganox 1010 (manufactured by BASF SE), 0.5 part by weight D-3: Hindered phenol-based antioxidant Irganox 1098 (manufactured by BASF SE), 0.2 part by weight D-4: Aromatic amine-based antioxidant Nonflex DCD (manufactured by Seiko Chemical Co., Ltd.), 0.8 part by weight D-5: Sulfur-based antioxidant Lasmit LG (manufactured by DKS Co. Ltd.), 0.2 part by weight Examples 1 to 10 and Comparative Examples 1 to 7

The thermoplastic polyester elastomer, the reactive compound, the flame retardant, and other additives were mixed at the blending ratio and the method for charging the reactive compound shown in Table 2 so as to obtain a thermoplastic polyester elastomer resin composition. The numerical value indicating the blending ratio in Table 2 means parts by mass. The performance of the obtained thermoplastic polyester elastomer resin composition was evaluated. The results are shown in Table 2. In Table 2, the details of the method of charging the reactive compound (Method A and Method B) are as follows.

Method A: A reactive compound was added and attached to 3 parts by mass of the thermoplastic polyester elastomer, and the thermoplastic polyester elastomer was charged into the molten resin composition from a side feeder.

Method B: The reactive compound was mixed with other components in advance and collectively charged from a hopper.

TABLE 2

| | | | Example 1 | Example 2 | Example 3 | Example 4 | Example 5 |
|---|---|---|---|---|---|---|---|
| Blending composition of resin composition | Thermoplastic polyester elastomer | A-1 | | | 96.7 | | |
| | | A-2 | 96.9 | 97.1 | | 96.7 | 97.3 |
| | | A-3 | | | | | |
| | | A-4 | | | | | |
| | Reactive compound | B-1 | 1.2 | 0.3 | 1.2 | 1.0 | 0.8 |
| | | B-2 | | 0.7 | 0.2 | | |
| | | B-3 | | | | 0.4 | |
| | | B-4 | | | | | |
| | Flame retardant | C-1 | | | | | |
| | | C-2 | | | | | |
| | Other additives | D-1 to D-5 | 1.9 | 1.9 | 1.9 | 1.9 | 1.9 |
| | Method for charging the reactive compound | — | A | A | A | A | A |
| Performance evaluation | Acid value | eq/ton | 1 | 14 | 1 | 2 | 11 |
| | Melt viscosity η5 (10 $sec^{-1}$, 230° C., preheating 5 min) | Pa · s | 3800 | 4700 | 2100 | 9500 | 3000 |
| | Melt viscosity (1000 $sec^{-1}$, 230° C., preheating 5 min) | Pa · s | 680 | 610 | 730 | 780 | 330 |
| | Melt viscosity η25 (10 $sec^{-1}$, 230° C., preheating 25 min) | Pa · s | 3500 | 3900 | 1900 | 9100 | 2400 |
| | Residence stability of melt viscosity η5/η25 | — | 1.09 | 1.21 | 1.11 | 1.04 | 1.25 |
| | Extrusion moldability | fluctuation in the discharge amount | ○ | ○ | ○ | ○ | ○ |
| | | Thickness uniformity (initial) | ○ | ○ | ○ | ○ | ○ |
| | Extrusion molding stability | Thickness uniformity (over time) | ○ | ○ | ○ | ○ | ○ |
| | Flame retardancy | — | — | — | — | — | — |
| | Heat resistance and heat aging resistance | — | ○ | ○ | ○ | ○ | ○ |

| | | | Example 6 | Example 7 | Example 8 | Example 9 | Example 10 |
|---|---|---|---|---|---|---|---|
| Blending composition of resin composition | Thermoplastic polyester elastomer | A-1 | | | | | |
| | | A-2 | 97.3 | 96.5 | 97.3 | 75.3 | |
| | | A-3 | | | | | |
| | | A-4 | | | | | 96.9 |
| | Reactive compound | B-1 | 0.7 | 0.6 | 0.3 | 0.8 | 1.2 |
| | | B-2 | 0.1 | | 0.5 | | |
| | | B-3 | | 1 | | | |
| | | B-4 | | | | 3 | |

TABLE 2-continued

| | | | | | | | |
|---|---|---|---|---|---|---|---|
| | Flame retardant | C-1 | | | | 15.0 | |
| | | C-2 | | | | 4.0 | |
| | Other additives | D-1 to D-5 | 1.9 | 1.9 | 1.9 | 1.9 | 1.9 |
| | Method for charging the reactive compound | — | A | A | A | A | A |
| Performance evaluation | Acid value | eq/ton | 13 | 7 | 14 | 3 | 3 |
| | Melt viscosity η5 (10 $sec^{-1}$, 230° C., preheating 5 min) | Pa · s | 3400 | 5700 | 4500 | 3200 | 4000 |
| | Melt viscosity (1000 $sec^{-1}$, 230° C., preheating 5 min) | Pa · s | 330 | 750 | 610 | 600 | 700 |
| | Melt viscosity η25 (10 $sec^{-1}$, 230° C., preheating 25 min) | Pa · s | 2700 | 6800 | 3500 | 2700 | 3500 |
| | Residence stability of melt viscosity η5/η25 | — | 1.26 | 0.84 | 1.29 | 1.19 | 1.14 |
| | Extrusion moldability | fluctuation in the discharge amount | ○ | ○ | ○ | ○ | ○ |
| | | Thickness uniformity (initial) | ○ | ○ | ○ | ○ | ○ |
| | Extrusion molding stability | Thickness uniformity (over time) | ○ | ○ | ○ | ○ | ○ |
| | Flame retardancy | — | — | — | — | V-2 | — |
| | Heat resistance and heat aging resistance | — | ○ | ○ | ○ | ○ | ○ |

| | | | Comparative Example 1 | Comparative Example 2 | Comparative Example 3 | Comparative Example 4 |
|---|---|---|---|---|---|---|
| Blending composition of resin composition | Thermoplastic polyester elastomer | A-1 | | 95.1 | 96.1 | |
| | | A-2 | 96.9 | | | 97.1 |
| | | A-3 | | | | |
| | | A-4 | | | | |
| | Reactive compound | B-1 | 1.2 | 2 | | 0.1 |
| | | B-2 | | | | 0.9 |
| | | B-3 | | 3 | 2 | |
| | | B-4 | | | | |
| | Flame retardant | C-1 | | | | |
| | | C-2 | | | | |
| | Other additives | D-1 to D-5 | 1.9 | 1.9 | 1.9 | 1.9 |
| | Method for charging the reactive compound | — | B | B | — | A |
| Performance evaluation | Acid value | eq/ton | 17 | 4 | 22 | 16 |
| | Melt viscosity η5 (10 $sec^{-1}$, 230° C., preheating 5 min) | Pa · s | 3500 | 6100 | 4200 | 4700 |
| | Melt viscosity (1000 $sec^{-1}$, 230° C., preheating 5 min) | Pa · s | 680 | 750 | 710 | 580 |
| | Melt viscosity η25 (10 $sec^{-1}$, 230° C., preheating 25 min) | Pa · s | 2600 | 8900 | 3900 | 4000 |
| | Residence stability of melt viscosity η5/η25 | — | 1.35 | 0.69 | 1.08 | 1.18 |
| | Extrusion moldability | fluctuation in the discharge amount | ○ | x | ○ | ○ |
| | | Thickness uniformity (initial) | ○ | x | ○ | ○ |
| | Extrusion molding stability | Thickness uniformity (over time) | x | x | Δ | Δ |
| | Flame retardancy | — | — | — | — | — |
| | Heat resistance and heat aging resistance | — | x | ○ | x | x |

| | | | Comparative Example 5 | Comparative Example 6 | Comparative Example 7 |
|---|---|---|---|---|---|
| Blending composition of resin composition | Thermoplastic polyester elastomer | A-1 | | 96.7 | |
| | | A-2 | 90.9 | | |
| | | A-3 | | | 96.9 |
| | | A-4 | | | |
| | Reactive compound | B-1 | 1.2 | 1.4 | 1.2 |
| | | B-2 | 1 | | |
| | | B-3 | 5 | | |
| | | B-4 | | | |
| | Flame retardant | C-1 | | | |
| | | C-2 | | | |
| | Other additives | D-1 to D-5 | 1.9 | 1.9 | 1.9 |
| | Method for charging the reactive compound | — | A | A | A |

TABLE 2-continued

| | | | | | |
|---|---|---|---|---|---|
| Performance evaluation | Acid value | eq/ton | 1 | 2 | 1 |
| | Melt viscosity η5 (10 $sec^{-1}$, 230° C., preheating 5 min) | Pa · s | 7400 | 1700 | 3600 |
| | Melt viscosity (1000 $sec^{-1}$, 230° C., preheating 5 min) | Pa · s | 930 | 600 | 650 |
| | Melt viscosity η25 (10 $sec^{-1}$, 230° C., preheating 25 min) | Pa · s | 7700 | 1500 | 3200 |
| | Residence stability of melt viscosity η5/η25 | — | 0.96 | 1.13 | 1.13 |
| | Extrusion moldability | fluctuation in the discharge amount | ○ | ○ | ○ |
| | | Thickness uniformity (initial) | x | Δ | ○ |
| | Extrusion molding stability | Thickness uniformity (over time) | Δ | x | ○ |
| | Flame retardancy | — | — | — | — |
| | Heat resistance and heat aging resistance | — | ○ | ○ | x |

As can be seen from Table 2, all of Examples 1 to 10 satisfying the requirements of the present invention exhibited small fluctuations of the discharge amount during extrusion molding, excellent initial thickness uniformity, and excellent extrusion moldability. In addition, it was also excellent in thickness uniformity over time and extrusion molding stability. The thermoplastic polyester elastomer was also excellent in heat resistance and heat aging resistance, which are basic performance requirements as a thermoplastic polyester elastomer. In particular, Example 9 exhibited stable extrusion moldability, extrusion molding stability, and heat resistance/heat aging resistance in spite of the addition of the flame retardant.

On the other hand, in Comparative Example 1, the blending ratio of the reactive compound was the same as that in Example 1, but since the reactive compound was charged together with other components, the thermoplastic polyester elastomer could not be sufficiently end-capped with the reactive compound, the acid value could not be sufficiently reduced, and the residence stability of the melt viscosity was poor. As a result, the viscosity was increased with time, the thickness fluctuated, and the extrusion molding stability was poor. It was also inferior in heat resistance and heat aging resistance.

In Comparative Example 2, since the amount of the reactive compound blended was excessive, an unreacted reactive compound remained, gelation occurred, and viscosity was increased, so that the melt viscosity was not stabilized, and the extrusion moldability was unstable from the initial stage of molding. In addition, since the reactive compound was charged together with other components, local thickening easily proceeded, and the residence stability of the melt viscosity was poor. As a result, the viscosity was increased with time, the thickness fluctuated, and the extrusion molding stability was poor.

In Comparative Example 3, a polycarbodiimide (B-1) excellent in the effect of decreasing the acid value was not blended at all as the reactive compound. Accordingly, the acid value could not be sufficiently decreased and the heat resistance and the heat aging resistance were poor. In addition, a glycidyl compound (B-3) used as the reactive compound increased the viscosity over time. Accordingly, the impairment of the residence stability of the melt viscosity due to a high acid value was offset, the residence stability of the melt viscosity was close to 1, the apparent range of fluctuation of the melt viscosity was not large, but the thickness fluctuated over time, and the extrusion molding stability was poor.

In Comparative Example 4, a polycarbodiimide (B-1) excellent in the effect of decreasing the acid value was hardly blended as the reactive compound. Accordingly, the acid value could not be sufficiently decreased and the heat resistance and the heat aging resistance were poor although the other points were the same as in Example 1. In addition, a glycidyl compound (B-2) used as the reactive compound increased the viscosity over time. Accordingly, the impairment of the residence stability of the melt viscosity due to a high acid value was offset, the residence stability of the melt viscosity was close to 1, the apparent range of fluctuation of the melt viscosity was not large, but the viscosity was increased over time and the thickness fluctuated, and the extrusion molding stability was poor.

In Comparative Example 5, since the amount of the polyfunctional epoxy compound (B-3) added was large, the thermoplastic polyester elastomer had a high molecular weight and many branches and therefore exhibited a high melt viscosity at a high shear rate, and the thickness uniformity was poor at the initial stage of molding.

In Comparative Example 6, a thermoplastic polyester elastomer having no branching was used as in Example 3. However, unlike Example 3, a trifunctional epoxy compound (B-2) was not added. Accordingly, the melt viscosity at a low shear rate was low, the shape retainability was low, the thickness was not stable over time, and the extrusion moldability was poor.

In Comparative Example 7, the soft segment was not an aliphatic polycarbonate but an aliphatic polyether. Accordingly, the heat resistance and heat aging resistance were inferior although the other points were the same as in Example 1.

INDUSTRIAL APPLICABILITY

The thermoplastic polyester elastomer of the present invention satisfies basic performance requirements for parts of automobiles and home electric appliances, such as heat resistance, weather resistance, heat aging resistance, water resistance, and low-temperature characteristics, and is also excellent in extrusion moldability and extrusion molding stability, so that it is possible to stably produce for a long time a hollow and long molded article required to have a uniform thickness such as a cable and a hose. Therefore, the present invention greatly contributes in industrial world.

The invention claimed is:

1. A thermoplastic polyester elastomer comprising a hard segment made of a polyester constituted of an aromatic dicarboxylic acid and an aliphatic or alicyclic diol and a soft segment mainly made of an aliphatic polycarbonate, wherein the hard segment and the soft segment are bonded to each other, wherein the thermoplastic polyester elastomer is at least partially end-capped with a reactive compound, wherein the reactive compound comprises a polycarbodiimide, wherein the thermoplastic polyester elastomer has an acid value of 15 eq/ton or less, and wherein, when a melt viscosity of the thermoplastic polyester elastomer is measured under a condition of 230° C. in accordance with JIS K 7199, the thermoplastic polyester elastomer satisfies (i) and (ii) below:

(i) the melt viscosity at a shear rate of 10/sec after a preheating time of 5 minutes is 1,800 Pa·s or more, and the melt viscosity at a shear rate of 1,000/sec after a preheating time of 5 minutes is 800 Pa·s or less; and (ii) a ratio of the melt viscosity measured at a shear rate of 10/sec after a preheating time of 5 minutes to the melt viscosity measured at a shear rate of 10/sec after a preheating time of 25 minutes is 0.7 to 1.3.

2. The thermoplastic polyester elastomer according to claim 1, wherein a reactive compound having at least one functional group selected from the group consisting of a glycidyl group, an acid anhydride group, and an isocyanate group is further comprised as the reactive compound.

3. A resin composition containing the thermoplastic polyester elastomer according to claim 1 and a flame retardant.

4. A molded article obtained by extrusion molding of the thermoplastic polyester elastomer according to claim 1.

5. The molded article according to claim 4, wherein the molded article is a cable or a hose.

* * * * *